(No Model.)

P. CARDIFF.
REMOVABLE SAW TOOTH.

No. 409,271. Patented Aug. 20, 1889.

Witnesses:
N. B. Harris.
W. B. Lord.

Inventor
Patrick Cardiff
Per.
J. Thos. Turner,
Attorney.

N. PETERS, Photo-Lithographer, Washington, D. C.

UNITED STATES PATENT OFFICE.

PATRICK CARDIFF, OF ASTORIA, OREGON.

REMOVABLE SAW-TOOTH.

SPECIFICATION forming part of Letters Patent No. 409,271, dated August 20, 1889.

Application filed March 6, 1889. Serial No. 302,088. (No model.)

*To all whom it may concern:*

Be it known that I, PATRICK CARDIFF, a citizen of the United States, residing at Astoria, in the county of Clatsop and State of Oregon, have invented certain new and useful Improvements in Insertible and Removable Teeth for Circular and Upright Saws; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to improvements in removable saw-teeth for circular saws; and it consists in the construction and novel arrangement of parts, as hereinafter set forth, illustrated in the accompanying drawings, and pointed out in the appended claims.

The object of my invention is to so construct the tooth and its locking-plate that when fitted in position said tooth will be firmly locked and a support formed for the tooth at the point where the greatest strain is exerted upon the tooth.

A further object of my invention is to provide the tooth and locking-plate with a V-shaped groove, said groove being formed in the edge of the tooth and plate adjacent to the saw proper, a V-shaped tenon of the latter being adapted to fit within said groove of the tooth and the locking-plate, and thus form a lock against any lateral displacement of these parts.

A further object of my invention is to so construct the tooth that the cutting-edge thereof will project a sufficient distance beyond the edge of the locking-plate that said tooth may be sharpened while in the saw numerous times before the tooth becomes worthless, obviating the necessity of removing the tooth, as is now the case with saw-teeth as commonly constructed.

Figure 1:
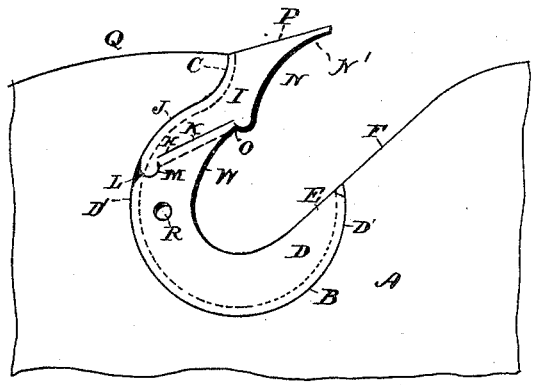
Figure 2:
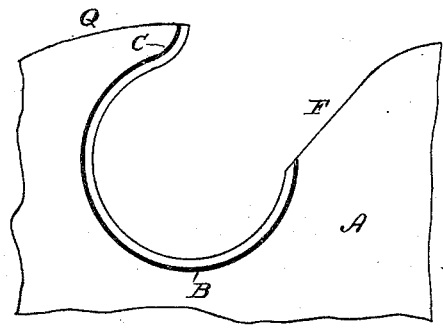
Figure 3:
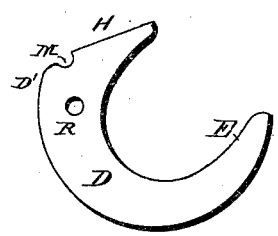
Figure 4:
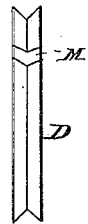
Figure 6:
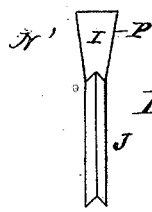
Figure 5:
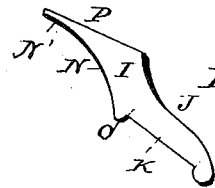
Figure 7:
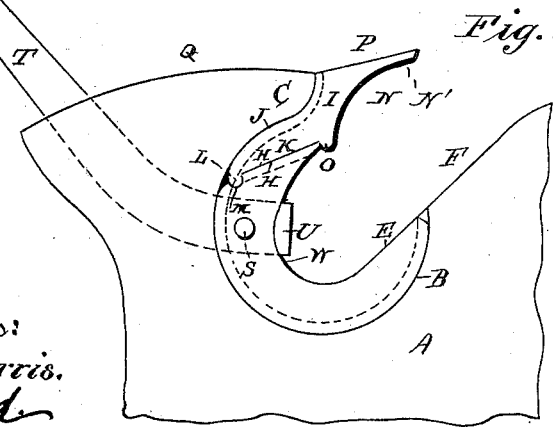

In the drawings, Figure 1 is a side view of my improved saw-tooth and locking-plate; Fig. 2, a detail view of the saw; Fig. 3, a like view of the locking-plate; Fig. 4, an end view of same; Fig. 5, a detail view of the tooth; Fig. 6, an end view of the same; Fig. 7, a side view complete, showing the wrench in position.

Referring to the drawings, A indicates the saw proper, cut away to form the circular bearing-edge B and the reverse bearing-edge C.

D indicates the locking-plate, of the form shown, one edge having the contour of the circular bearing-edge B, designed to fit snugly against the same, and a rectilinear edge E, to form a continuation of the like edge F of the saw A.

The locking-plate is cut away to form the straight edge H, and is provided with a semicircular groove or notch M at the junction of said edge and the curved edge D', for a purpose hereinafter explained.

I indicates the saw-tooth, provided with the ogee-curved edge J, which for a portion of its length, when the tooth is in position, forms a continuation of the curved edge D' of the locking-plate D and has a bearing against the curved edges B C of the saw. By this arrangement it will be seen that the bearing-edge C forms a support for the tooth at the point where the greatest strain is exerted thereon, and this constitutes an important feature of my invention. The saw-tooth is further provided with a rectilinear edge K, which has a bearing against the edge H of the locking-plate, and a knuckle or teat L, which fits within the semicircular recess or notch M of the locking-plate. The saw-tooth is cut away at its front, as shown at N, to form a cutting-edge N', projecting beyond the edge of the locking-plate, and is provided with a shoulder O, which abuts against the nose of the locking-plate. The tooth also has a straight edge P, which forms a continuation of the edge Q of the saw.

In order to secure the saw-tooth and its locking-plate against lateral displacement when in position, I form a V-shaped groove in the tooth along the edge J, and the locking-plate with a like groove along its curved edge D', into which grooves is adapted to fit a V-shaped tenon formed on the saw proper along its circular edges B and C.

It will be understood that instead of forming the grooves in the locking-plate and the tooth and the tenon on the saw this arrangement could be reversed and the same results obtained.

To form additional means for preventing lateral displacement of the tooth, the latter is provided with a V-shaped tenon along its edge K, which fits into a V-shaped groove of the locking-plate along the edge H. To facilitate the insertion of the tooth and the locking-plate, as well as the removal of these parts for any cause, I provide an opening R in the locking-plate, adapted to receive an outstanding stud or lug S on a wrench T, which is also provided with a shoulder U, which, when the wrench is in place, bears against the curved edge W of the locking-plate.

Having described my invention, what I claim, and desire to secure by Letters Patent, is—

1. The combination, with a saw A, having the bearing-edges B C, of a locking-plate D, having a bearing-edge D' of the contour of edge B, and a straight edge H, and the tooth I, having ogee-curved edge J and the straight edge K, said parts being adapted to fit together in the manner described, and for the purposes specified.

2. The combination, with a saw A, having the bearing-edges B C, of the locking-plate D, having a bearing-edge D' of the contour of edge B, and a straight edge H, and the notch or recess M, the tooth I, having the ogee-curved edge J, the straight edge K, and a teat adapted to fit within said notch or recess, substantially as specified.

3. The combination, with a saw A, having bearing-edges B C, of the locking-plate D, having bearing-edge D' of the contour of edge B, a straight edge H, and a notch or recess M, and the tooth I, having ogee-curved edge J, the straight edge K, a teat adapted to fit within said notch or recess, and a shoulder O, which abuts against the nose of the locking-plate, substantially as specified.

4. The combination, with a saw A, having bearing-edges B C and a V-shaped tenon along said edges, of the locking-plate D, having bearing-edges D' H and a V-shaped groove along said edges, and the tooth I, having the grooved ogee-curved edge J and straight edge K, provided with a tenon, said parts being adapted to fit together as specified.

5. The combination, with a saw A, having the bearing-edges B C, of a locking-plate D, having a bearing-edge D' of the contour of edge B, a straight edge H, and the curved bearing-edge W, and the tooth I, having ogee-curved edge J and straight edge K, and the cutting edge N', projecting beyond the edge W of the locking-plate, for the purpose specified.

In testimony whereof I have affixed my signature in presence of two witnesses.

PATRICK CARDIFF.

Witnesses:
 G. C. FULTON,
 G. Z. BADON.